United States Patent [19]

Favret, Jr.

[11] 4,252,649

[45] Feb. 24, 1981

[54] METHOD AND APPARATUS FOR RECOVERING OIL

[76] Inventor: Uncas Favret, Jr., 316 Silver Oak Lane, River Ridge, La. 70123

[21] Appl. No.: 83,278

[22] Filed: Oct. 10, 1979

Related U.S. Application Data

[63] Continuation-in-part of Ser. No. 15,468, Feb. 26, 1979, abandoned.

[51] Int. Cl.³ .................. B01D 21/00; B01D 23/00; B01D 12/00
[52] U.S. Cl. ............................ 210/800; 210/110; 210/115; 210/170; 210/538
[58] Field of Search ............... 210/74, 83, 84, 110, 210/115, 170, 197, 513, 538, 540

[56] References Cited

U.S. PATENT DOCUMENTS

| | | | |
|---|---|---|---|
| 1,170,558 | 2/1916 | Nonnenbruch | 210/83 |
| 2,405,158 | 8/1946 | Mensing | 210/84 |
| 3,425,556 | 2/1969 | Völker | 210/115 |
| 3,756,409 | 9/1973 | Carmichael et al. | 210/104 |
| 3,893,918 | 7/1975 | Favret, Jr. | 210/104 |

Primary Examiner—Charles N. Hart
Assistant Examiner—E. Rollins Cross
Attorney, Agent, or Firm—Burns, Doane, Swecker & Mathis

[57] ABSTRACT

Oil is recovered from an oil containing fluid mixture ecologically acceptable fluid is disposed of in a water body through the use of an open ended skim pile disposed in the water body and an interconnected skimmer vessel where fluid is maintained at a level independent of the mean level of the water body.

18 Claims, 5 Drawing Figures

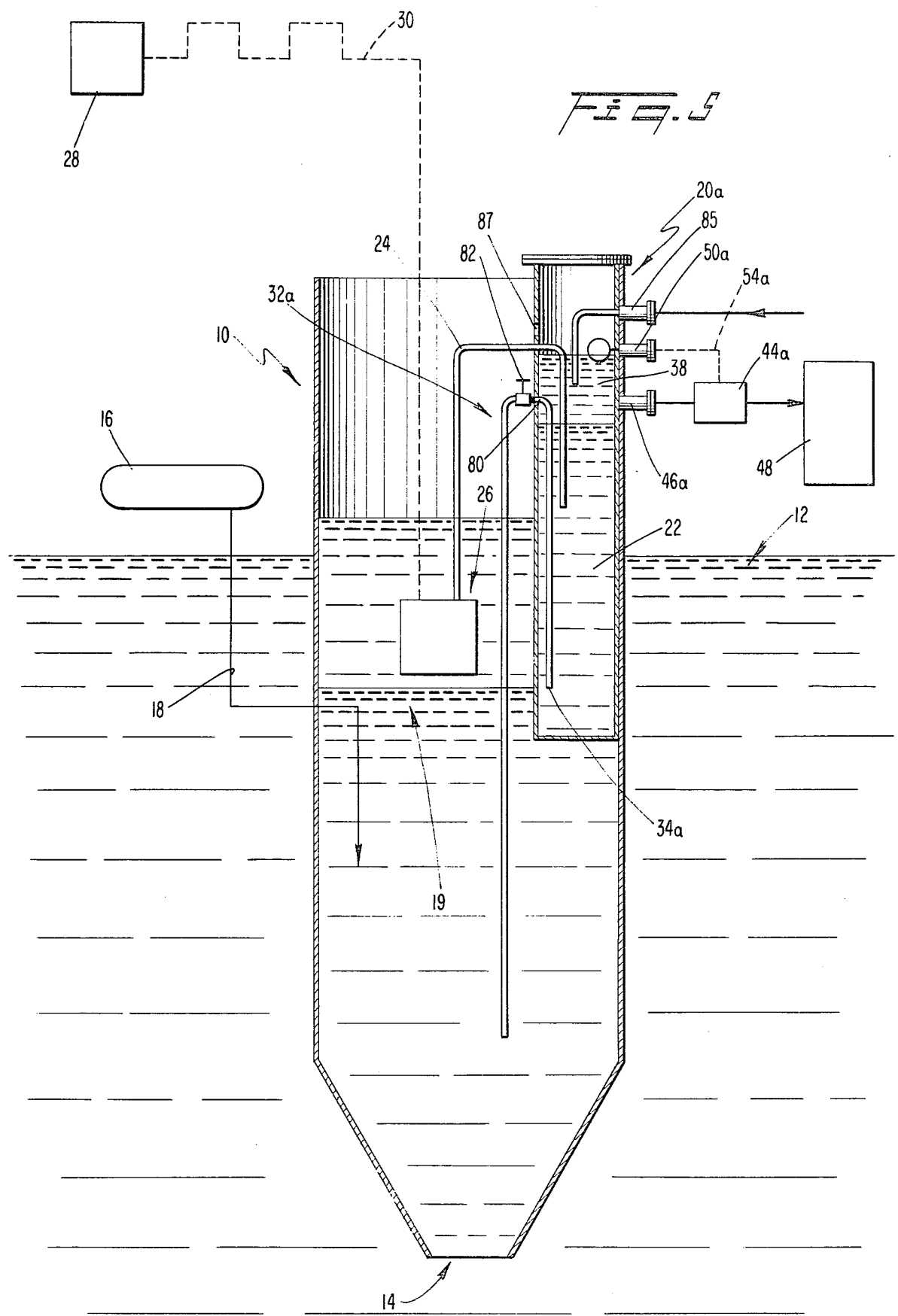

METHOD AND APPARATUS FOR RECOVERING OIL

RELATED APPLICATION

This application is a continuation-in-part of application Ser. No. 15,468, filed Feb. 26, 1979 now abandoned.

BACKGROUND OF THE INVENTION

This invention relates to recovering oil from an oil containing fluid mixture. In particular, this invention relates to such recovery at an oil handling facility located adjacent to a body of water, and to the disposal of the relatively oil-free fluid into the body of water.

In U.S. Pat. No. 3,893,918, issued July 8, 1975, there are disclosed skim piles or elongate separator conduits that are useful and efficient in such recovery and disposal operations. The length of the conduit and the operating procedures are such that the rising velocity of the oil in the mixture results in the establishment of an upper oil layer in the conduit.

One of the skim piles disclosed in that patent operates while in continuous communication with the body of water. As such, the total fluid level in the skim pile is responsive to changes in mean level of the water body. Provision is made for withdrawing oil from the oil layer on top of the total fluid column in response to sensing of the level of the interface between such oil layer and the remaining fluid column therebelow. In that fashion, one seeks to insure that only an oil rich mixture is withdrawn from the skim pile, rather than an oil-water mixture. Although that technique has proved quite acceptable, some difficulties have been encountered especially in situations where unpredictably large or erratic total fluid level changes are produced in response to changes in mean level of the body of water.

U.S. Pat. No. 3,893,918 also discloses a form of skim pile where the level of total fluid in the skim pile is basically isolated from changes in the mean level of the water body through use of a valve. Problems associated with changes in that mean water level are thereby avoided. Such skim piles are normally employed only in shallow water situations where the underwater extent of the skim pile, if it were open at the bottom, would not normally be great enough to allow for good separation of oil. This is because the terminal rising velocity of the oil would not sufficiently overcome the exit velocity of downward flow in the conduit. Although normally closed, valved, skim piles could be employed in deeper water situations, operational and maintenance difficulties could become prominent by reason of the need to control a valve positioned at great depth.

Another form of skim pile has accomplished isolation of the total fluid therein from changes in mean water level without problems associated with underwater valve operation. In that form of skim pile, a generally U-shaped conduit is connected at one end near the bottom of the skim pile, and the upper covered portion of the conduit extends well above the water line. The U-shaped conduit thus functions as a weir which essentially maintains a fixed, above-water level of total fluid in the skim pile, while isolating that fluid from level changes in the water body. However, use of such skim piles is not without its problems. The expense associated with construction of the weir leg can itself be quite considerable in deep water installations. Moreover, difficulties may be associated with removal of solid particles, such as sand, which settle out and collect at the bottom of the skim pile. A valve can be employed for periodic release of those collected particles, but, again, that creates the necessity for underwater valve operation and maintenance.

In U.S. Pat. No. 3,756,409, issued Sept. 4, 1973, there is proposed a separator conduit where an internal weir-like arrangement is employed, not for total fluid maintenance, but for collection, in a tube, of spillover oil which rises to the top of the fluid column in the conduit. Since that fluid column is responsive to changes in mean level of the body of water, it will be appreciated that spillover of substantial amounts of water into the collection tube could easily result, thereby considerably reducing the efficiency of operation.

OBJECTS AND SUMMARY OF PREEFERRED FORMS OF THE INVENTION

It is a general object of the present invention to provide an oil recovery method and apparatus that obviates or minimizes problems of the sort previously noted.

It is a related object of the present invention to provide such a method and apparatus wherein changes in mean water level do not adversely affect operation and wherein essentially continous separation may take place.

Another object of the present invention is to provide a novel, efficient method and apparatus for recovering oil from an oil containing fluid mixture adjacent an oil handling facility and disposing of the relatively oil-free fluid into an adjacent body of water.

It is a particular object of the present invention to provide a novel recovery method and apparatus employing an open ended skim pile, but where oil recovery is isolated from changes in mean water level.

It is an independent object of the present invention to provide a novel settling tank assembly for use in oil recovery, particularly in connection with such skim pile operations.

A preferred form of the invention intended to accomplish these and other objects utilizes an elongate separator conduit, or skim pile, and an interconnected settling tank or skimmer assembly. The skim pile is disposed in a generally upwardly extending posture, with an exit zone thereof in continuous communication with a body of water, beneath the surface thereof. This establishes a fluid column within the skim pile to a height responsive to the mean level of the water body. An oil-containing fluid mixture is supplied into the fluid column within the skim pile in a manner that permits oil to rise to the upper region of the fluid column so as to establish an upper oil layer.

In the settling tank or skimmer vessel, a head of fluid is established and maintained at a level independent of the mean level of the water body. Thus, the skimmer assembly may be considered to be functionally external to and remote from the skim pile in the sense that the total fluid level in the skimmer assembly is independent of the mean level of the water body which determines the level of fluid in the skim pile. It will, however, be appreciated that the skimmer assembly may be physically proximate to and even mounted within the skim pile.

In any case, fluid is intermittently transferred from the upper region of the skim pile, through a transport conduit, to the isolated head of fluid in the settling tank. Although changes in mean water level may affect the constituency of the transferred fluid, it will consist mainly if not entirely of separated oil.

Even if water and/or solids, such as sand, happen to be transferred because of the level of total fluid in the skim pile at the time of transfer, the isolated separation which takes place in the settling tank nevertheless results in the establishment of an essentially pure oil layer at the top end of the head of fluid therein. This oil is recovered from the upper end of that head of fluid.

Excess fluid from the settling tank is refluxed by transfer from the lower end of the settling tank back to the skim pile. There, any oil in the refluxed fluid is separated out through normal skim pile operation. As such, essentially continuous separation is taking place, either in the skim pile or in the settling tank, or both; and ecologically acceptable (i.e., non-oil contaminated) fluid is still being disposed of in the water body. Moreover, the ultimate oil recovery is isolated from changes in the level of the water body, thereby enhancing the efficiency of the recovery operation.

The reflux operation may be accomplished through the use of a total fluid level control weir associated with the settling tank. This weir also maintains the established head of isolated fluid in the settling tank. A siphon breaker in the form of an air inlet is associated with the level control weir to prevent siphoning of the contents of the settling tank after excess fluid is automatically refluxed though the level control weir. The level control weir may be considered to functionally be an external weir in the sense that the level control influence that it exerts on total fluid in the skimming vessel is external to the fluid head conditions that would otherwise exist therein. However, a substantial portion or even most of that weir may be mounted within the skimmer assembly.

An internal, separating weir may be located within, and form a portion of, the settling tank assembly adjacent its upper end. This separating weir serves to isolate spillover oil from the established head of fluid in the settling tank. The weir preferably comprises an open-ended, generally conical shape barrier between that head of fluid and the spillover oil.

By gradually restricting the space that the separated oil can occupy and thus increasing the height of the top oil layer, such a construction of the separating weir minimizes the interface area between the separated oil and the fluid beneath. In this fashion, the relative purity of the oil which lies above the interface is enhanced. Hence the purity of the spillover oil that is ultimately recovered is also enhanced.

Adjustably mounted in the open upper end of the conical shaped barrier is an open ended tube that forms a continuation of the separating weir. The adjustability of the outlet of the tube allows for fine adjustment of the height of the upper oil layer and thus further aids in controlling the purity of the spillover oil.

Further details and advantages of preferred forms of the invention will become apparent from the subsequent detailed description, with reference to the accompanying drawings, where like reference characters indicate like elements, and in which:

THE DRAWINGS

FIG. 5 is a schematic elevational view similar to FIG. 1 but wherein the skimmer assembly is mounted within the skim pile.

DETAILED DESCRIPTION

Figure 1:
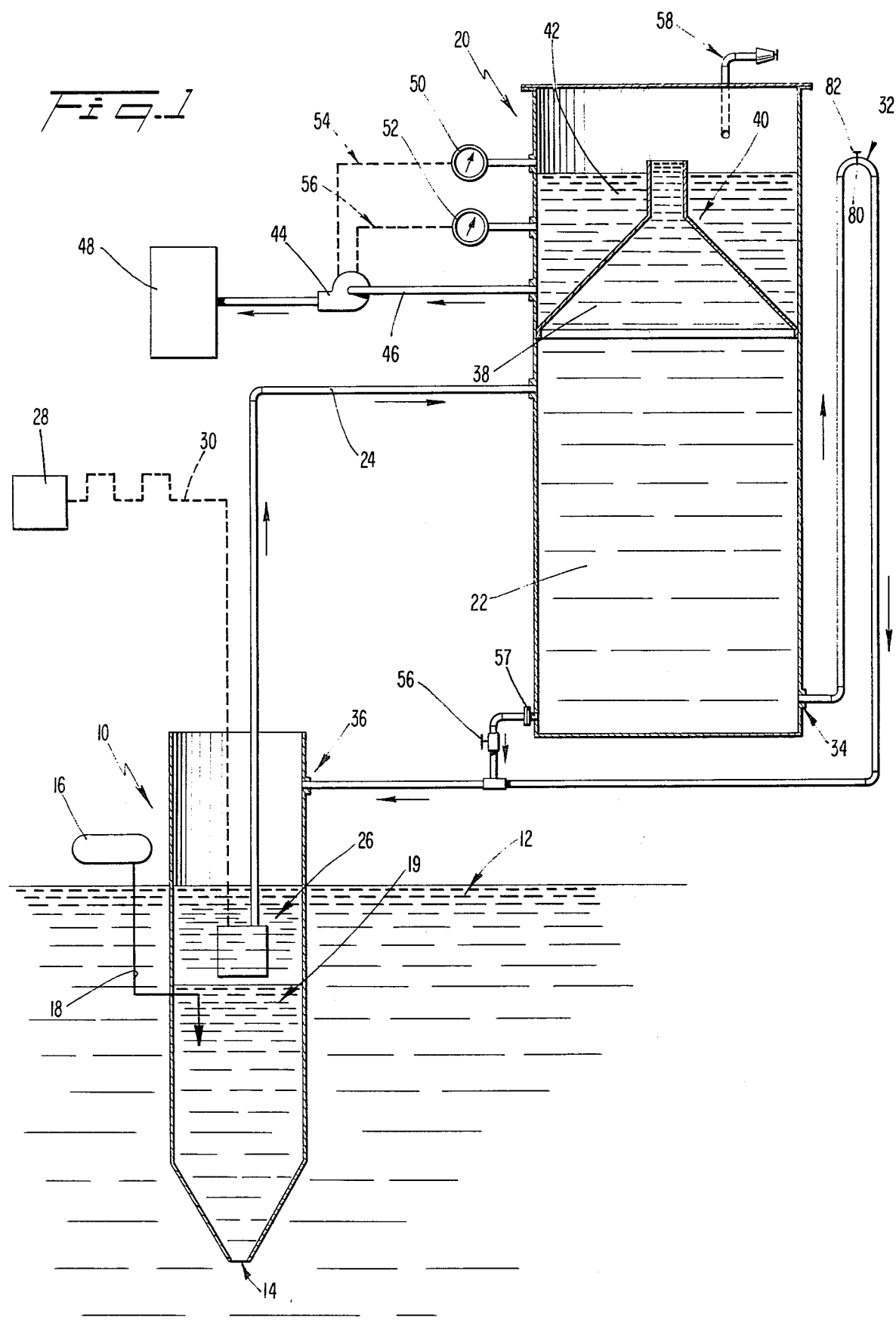
FIG. 1 is a schematic elevational view of a preferred form of oil recovery apparatus according to the present invention and illustrates a preferred oil recovery method according to the present invention.

From FIG. 1, one basic structure and method for recovering oil in accordance with the present invention may be understood.

An elongate, open bottom separator conduit, or skim pile 10 is disposed in a generally upwardly extending posture in a body of water 12 adjacent an oil handling facility. The open bottom 14 of the skim pile establishes an exit zone in continuous communication with the water body.

An oil containing fluid mixture is supplied to the skim pile 10 from a suitable source 16, through supply conduits, schematically indicated at 18. The mixture so supplied may eminate from skid drains or other sources associated, for example, with an offshore drilling operation. In any event, the manner of supply of the mixture is sufficient to permit oil to rise to the upper region 19 of the fluid column within the skim pile 10. This establishes an upper layer of oil on that fluid column.

Preferably the structure of the open ended skim pile 10 and the fluid mixture supply equipment associated therewith, as well as the operation thereof, is essentially identical to that described in U.S. Pat. No. 3,893,918, the disclosure of which is hereby incorporated by reference. It will, however, be appreciated that other forms of separator conduits and other operational techniques may be employed, while still realizing the benefits of the present invention.

The skim pile 10 is interconnected with a settling tank assembly 20, where a head of fluid 22 is established and maintained at a level independent of the level of the water body 12. Any convenient location for the settling tank assembly 20 will suffice, for example on a drilling platform (not shown) where the source fluid supplied to the skim pile 10 eminates. Alternatively, the settling tank assembly 20 may be suspended from or mounted on the portion of the skim pile 20 which projects well above the water body 12. As will also become apparent, the settling tank assembly or skimmer vessel 20 may even be mounted within the skim pile 12 (see FIG. 5).

Fluid is intermittently transferred from the upper region 19 of the skim pile 10 to the isolated head of fluid 22 in the settling tank assembly 20. In this connection, a transfer conduit is schematically depicted at 24 in FIG. 1. The inlet to the transfer conduit 24 is connected to a pump or blowcase 26 disposed in the fluid at the upper region 19 of the skim pile.

At many, if not most, times the fluid in this upper region will consist by and large of relatively pure oil. An interface control system, such as the one described in the previously incorporated disclosure of U.S. Pat. No. 3,893,918, may even be employed to help insure that this is the case. If, however, transfer occurs at times of large or erratic total fluid level changes in the skim pile 10 (in response to changes in the mean level of the water body 12), the fluid so transferred would not be entirely suitable for immediate recovery.

The use of the interconnected settling tank assembly 20 remedies that problem without any need for concern over the accuracy or reliability of an interface control. In fact such control may, if desired, be dispensed with; and transfer of fluid to the settling tank assembly may be accomplished at intervals in any suitable manner. For example, a suitable time based intermitter 28, with or without manual override, may be used to provide a substantial control signal 30 to the pump or blowcase 26.

When a pump initiates the transfer to the settling tank assembly 20, suction from the pump withdraws the fluid from the upper region 19 of the skim pile 10. When a blowcase is used, pressure is the initiating transfer force. In this regard, a blowcase basically comprises a tube with inlet and outlet check valves. Fluid flows into the tube through the inlet check valve until the tube is filled, at which time the pressure of the internal fluid holds both check valves closed. A supply of external pressure to outlet check valve serves to open the outlet and blow out the contents of the tube, while at the same time forcing the inlet check valve closed, all in a manner which will be readily appreciated by those skilled in the art.

The overall level of fluid in the settling tank assembly 20 depicted in FIG. 1 is maintained by a level control weir assembly schematically indicated at 32. This weir assembly 32 is essentially a generally U-shaped tube disposed in a generally vertical position. Its inlet is connected to the lower end of the settling tank, as indicated at 34, and its outlet connected to the skim pile, as indicated at 36. Thus, when fluid is transferred to the settling tank, excess fluid above the level maintained by the weir refluxes back to the skim pile.

In this connection, the inlet 34 to the level control weir 32 is disposd at the lower end of the settling tank so that the most relatively oil-free fluid is refluxed, while the oil-rich fluid remains to undergo separation within the settling tank during periods when the total fluid therewithin is basically at rest. This oil rises toward the top of the settling tank to establish an upper oil layer 38 therewithin.

This upper oil layer 38 is surrounded by an open-ended, generally conical barrier 40 that forms a portion of the settling tank and establishes a separating weir. In a manner more fully described below, rising oil spills over the separating weir 40, and the spillover oil 42 is isolated from the established head of fluid 22.

The isolated oil so recovered may be transported to any desired location in any suitable manner. For example, a pump 44 may be employed to withdraw oil through an outlet conduit 46 and deliver the oil into the main system 48 associated with the oil handling facility.

Preferably, withdrawal of oil by the pump 44 is controlled through conventional high and low level sensors 50 and 52. These sensors communicate with the zone reserved for spillover oil 42 and provide initiation and termination signals 54 and 56 to the pump 44.

Solids such as sand which deposit at the bottom of the settling tank may also be removed and refluxed. For this purpose a valve 56, located at the bottom of the settling tank, permits emptying of the solids into the conduit which carries the reflux fluid that exits through the level control weir 32. The valve may be manually operated or automatically controlled in any suitable manner.

While the settling tank assembly or skimmer vessel 20 heretofore described employs the level control weir 32 to maintain fluid level and to permit reflux, it will be appreciated that other structures may be alternatively utilized. In this regard, the level control weir 32 may be dispensed with and both the fluid level of the settling tank and refluxing may be entirely controlled by the valved outlet 56 from the bottom of the tank which directly feeds back to the skim pile 10.

The tank would then basically become a miniaturized closed end skim pile of the type described in U.S. Pat. No. 3,893,918, with the advantage that the valved outlet is more readily accessible. Of course, this arrangement would necessitate insuring that the valve 56 is controlled in a manner which would avoid overfilling the settling tank, and the atmospheric vent 58 shown in FIG. 1 would be deleted. The separating weir 40 could, however, be retained.

Figure 2:
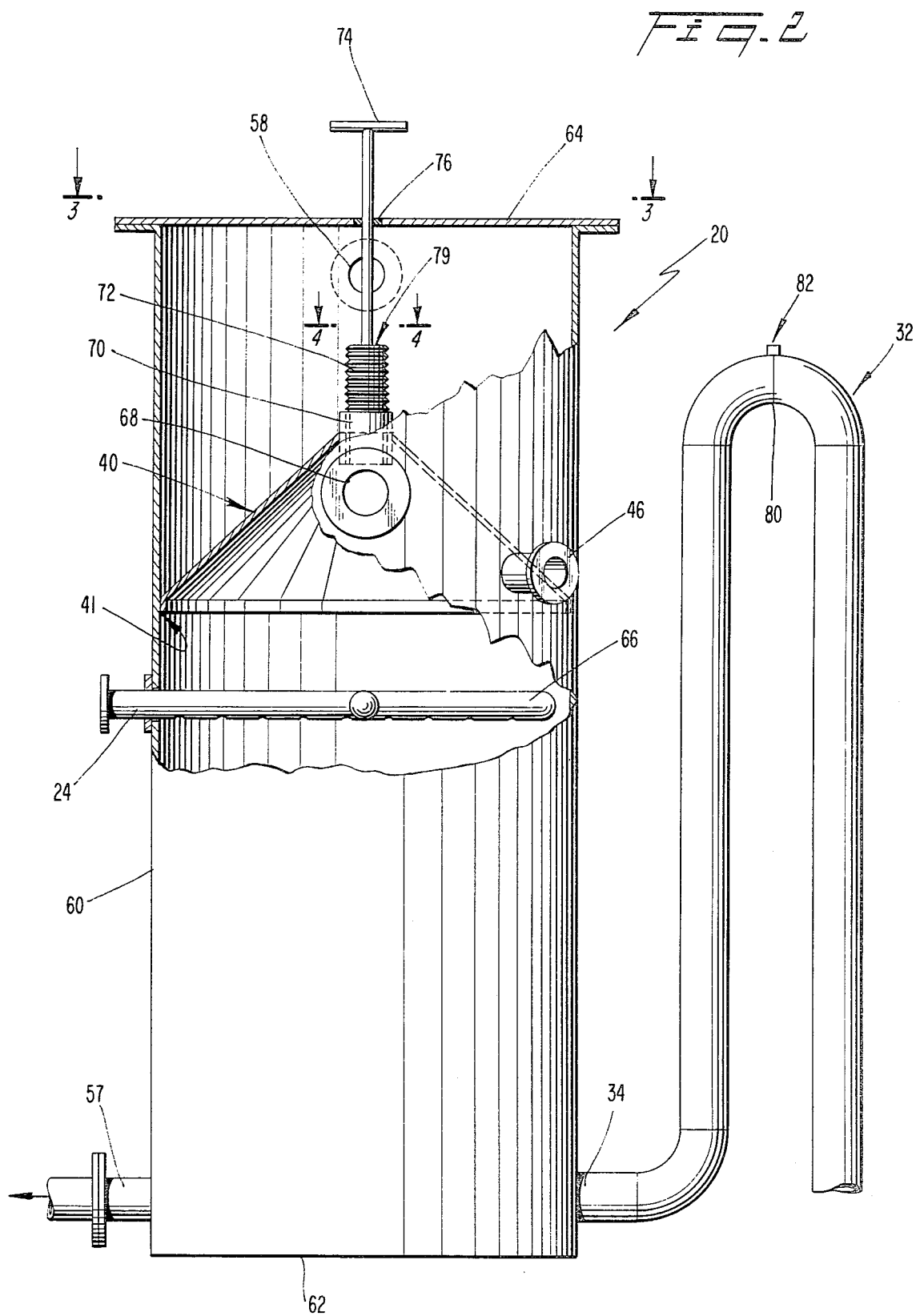
FIG. 2 is an elevational view, partially in section, depicting a settling tank assembly in accordance with the present invention.
Figure 3:
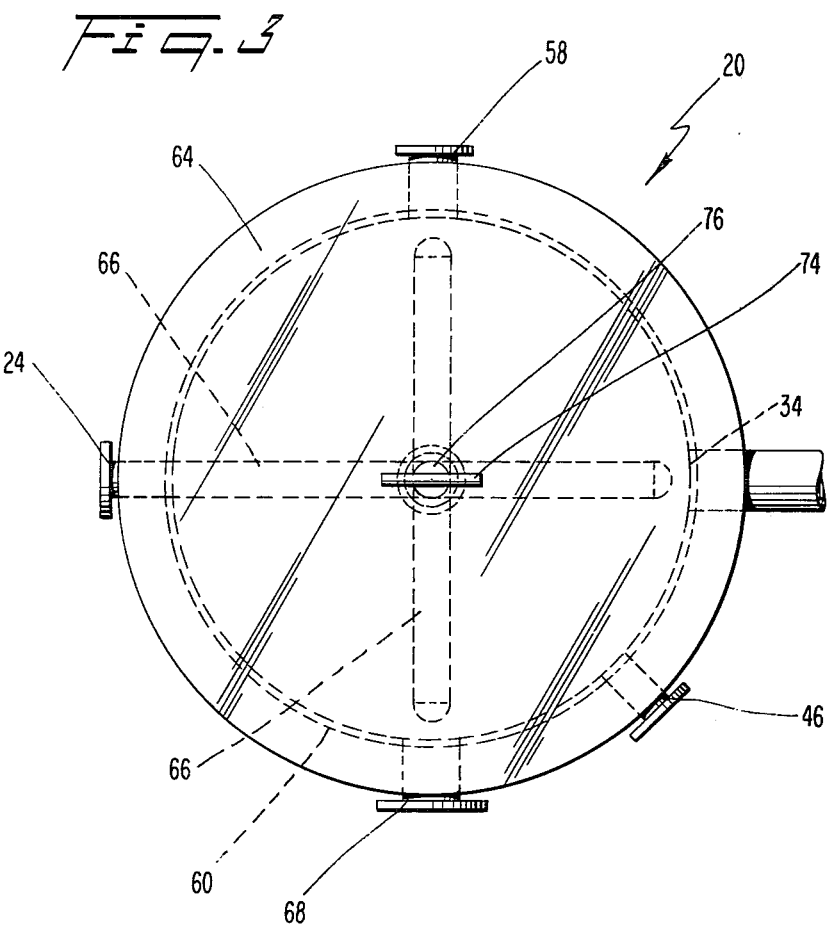
FIG. 3 is a top plan view of the settling tank assembly of FIG. 1.
Figure 4:
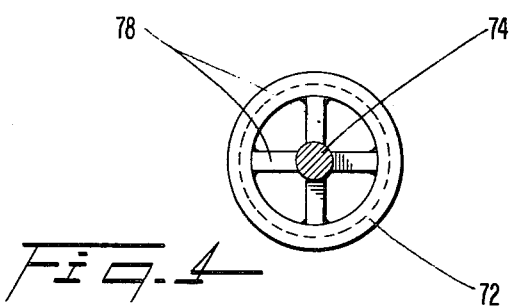
FIG. 4 is a sectional view of the adjustable outlet from the internal weir of the settling tank tubes along line 4—4 of FIG. 2.

FIGS. 2-4 depict further details of the separating weir 40 as well as other portions of the settling tank assembly 20.

The basic settling tank structure is comprised of a generally cylindrical vessel 60 with a closed bottom 62 and a cover plate 64. All fluid transfer to and from the vessel 60 occurs through the cylindrical sidewall.

The transfer conduit 24 which brings fluid from the skim pile terminates in a distribution header 66 internally of the vessel at a level slightly beneath the separating weir 40. The vessel outlet which constitutes the inlet 34 to the level control weir 32 is located near the bottom of the vessel, as is a fitting 57 for the valved outlet 56.

Slightly above the level at which the conical separating weir 40 joins the cylindrical sidewall 60 to which it is welded (as indicated at 41), the outlet 46 for the spillover oil is located. Thereabove, a fitting 68 associated with the high and low level spillover oil sensors 50 and 52 (not shown in FIG. 2) is positioned. Near the top of the vessel 60, the atmospheric vent 58 is disposed.

The uppermost open end of the conical weir 40 includes a cylindrical sleeve 70 which is internally threaded. Adjustably threadably received within the sleeve is an externally threaded, open-ended tube 72 which forms a continuation of the weir.

Adjustment of the tube 72 is accomplished by the turning of a T-shaped bar 74 that projects into the vessel 60 through a packing gland 76 in the cover plate 64. The lower end of the bar 74 is welded to a cross web assembly 78 located internally of the tube 72 (see FIG. 4). As will be appreciated, through adjustment of the sleeve, the level at which spillover occurs can be finely adjusted.

In operation, the level control weir 32 maintains an established level of fluid in the vessel 60 and provides for refluxing of excess fluid. Siphoning of the vessel contents is prevented by a siphon breaker 82 of conventional construction which is located at the curved or transition section 80 of the level control weir.

Oil within the vessel 60 rises toward the top where it forms a layer. The conical separating weir 40 restricts the upper oil layer and tends to maximize the height thereof for a given volume. Thus, an oil rich top portion of the layer is insured and the oil-water interface is reduced to further minimize the possibility of water contamination.

The adjustable tube 72 which forms a continuation of the separating weir 40 allows for adjustment of the height at which spillover occurs. Because of the manometer resulting from the interconnection between the vessel 60 and the level control weir 32, the level inside the vessel 60 will tend toward a height greater than the fluid level in the level control weir 32 (see FIG. 1). This is because the density of the oil at the top of the fluid in the vessel 60 is less than the density of the fluid in the level control weir. Thus, the resulting force balance required in the manometer effect cannot take place unless the total fluid in the vessel (including the lighter upper oil layer) is higher than the fluid in the level control weir 32 when the system is at rest.

Therefore, if the outlet 79 (see FIG. 2) of the adjustable tube 72 is maintained slightly above the high point of the level control weir 32, the manometer effect will produce spillover. Of course, spillover could occur if the outlet 79 is located below the high point of the level control weir 32, but this could ultimately result in water spilling over.

Accordingly, the outlet 79 is adjustable within limits between the low point of the transition section 80 of the level control weir and a location slightly above the high point of that transition section 80. In intermediate positions the natural spillover from the manometer effect will take place, as will a forced spillover that results from fluctuations in fluid level in the level control weir, which fluctuations are produced between times of refluxing and times of rest.

In the embodiment of the invention depicted in FIG. 5, a skimmer assembly 20a is physically mounted within the skim pile 10. For ultimate oil withdrawal by a pump 44a a conduit 46a also thus passes through the skim pile sidewall. If desired, some relatively oil-rich fluid which is to undergo separation may be introduced directly into the skimmer assembly 20a from some suitable source through a conduit indicated at 85.

Generally, the skimmer assembly 20a is similar in structure and function to the skimmer vessel 20 already described, and further detailed description is unnecessary. However, it should be noted that the separating weir has not been illustrated in conjunction with FIG. 5. Although it may be employed, if desired, it is not normally quite as justified where, as in the case of FIG. 5, the skimmer assembly 20a is itself conveniently structured with a greater length and a smaller diameter that aids in producing a relatively deep oil layer 38 at the top of the fluid column 22.

It will also be apparent that the level control weir 32a is depicted as having at least one leg physically within the skimmer vessel 20a. Nevertheless its function is similar to that of the level control weir 32 previously described in that it establishes and maintains a desired total fluid level and refluxes excess fluid. In this latter connection, the inlet 34a to the weir 32a is disposed near the bottom of the skimmer assembly so that fluid with the least amount of oil is to be refluxed. The siphon breaker 82, of course, prevents emptying of the skimmer vessel contents below the desired level.

Because of the relatively small diameter of the skimmer vessel 20a the system hydraulics are such that the upper oil layer 38 of total fluid will normally extend considerably above the uppermost transition section 80 of the level control weir 32a. A high level oil spillover opening 87 may be provided in the skimmer vessel so that if the level gets too high, oil will spillover into the basically oil-rich layer 19 in the skim pile 10.

Withdrawal of oil from the skimmer assembly 20a by the pump 44a may be controlled by any suitable level control device 50a disposed at which provides appropriate control signals 54a.

Although the present invention has been described in connection with preferred forms thereof it will be appreciated that additions, modifications, substitutions and deletions may be made without departing from the spirit and scope of the invention.

What is claimed is:

1. Apparatus for recovering oil from an oil containing fluid mixture at an oil handling facility located adjacent a body of water and disposing of the relatively oil-free fluid into the body of water, the apparatus comprising:
   upwardly extending and elongate separator conduit means positioned in the body of water and defining an upper fluid entrance zone and a lower fluid exit zone, the exit zone being in continuous communication with the body of water beneath the surface thereof to establish within the separator conduit means a fluid column to a height responsive to the mean level of the body of water;
   fluid supply means for supplying an oil containing fluid mixture to said fluid entrance zone;
   settling tank means for establishing a head of fluid at a level independent of the mean level of the body of water;
   transport means for intermittently transferring fluid from said separator conduit means to the head of fluid in said settling tank means;
   reflux means for transferring excess fluid from the lower end of said settling tank means to said separator conduit means; and
   recovery means for recovering oil from the upper end of the head of fluid in the settling tank means.

2. The apparatus according to claim 1 wherein:
   said reflux means includes level control weir means for maintaining the level of the established head of fluid in said settling tank means.

3. The apparatus according to claim 2 wherein:
   said recovery means includes separating weir means, within and forming a portion of said settling tank means adjacent its upper end, for isolating spillover oil from the established head of fluid in said settling tank means.

4. The apparatus according to claim 3 wherein:
   said separating weir means comprises an open ended, generally conical shaped barrier between the established head of fluid in the settling tank and spillover oil within the settling tank.

5. The apparatus according to claim 4 wherein:
   said separating weir means further comprises an open ended tube, adjustably mounted in the upper end of said barrier and forming a continuation thereof.

6. The apparatus according to claim 4 wherein:
   said recovery means includes level sensing means for controlling withdrawal of spillover oil from the settling tank means.

7. The apparatus according to claim 2 wherein:
   said reflux means includes siphon breaker means connected to said level control weir means.

8. The apparatus according to claim 1 wherein:
   said recovery means including level sensing means for controlling the recovery of oil from the upper head of fluid in the settling tank means.

9. In an oil recovering apparatus wherein oil is flowed to the upper region of a skim pile that is in continuous communication with a body of water so that the total fluid in the skim pile is responsive to changes in the mean level of the body of water, the improvement comprising:

a settling tank;

means for maintaining a head of fluid in said settling tank at a level independent of the mean level of the body of water;

means for intermittently transferring fluid from the skim pile to said settling tank whereby oil is permitted to flow upwardly to form an upper layer of the head of fluid in said settling tank;

means for recovering oil which flows to the upper layer of the head of fluid in the settling tank; and means for refluxing fluid from beneath the upper layer to the skim pile.

10. The apparatus according to claim 9 wherein:

said means for refluxing fluid and said means for maintaining a head of fluid compose level control weir means.

11. The apparatus according to claim 10 including:

siphon breaker means connected to said level control weir means.

12. The apparatus according to claim 11 wherein:

said means for recovering oil including level sensing means for controlling the recovery of oil.

13. A method of recovering oil from an oil containing mixture at an oil handling facility located adjacent a body of water and disposing of the relatively oil-free fluid into the body of water, the method utilizing an elongate separator conduit means and interconnected settling tank means disposed remotely therefrom, the method comprising:

disposing the separator conduit means in a generally upwardly extending posture with an exit zone thereof in continuous communication with the body of water beneath the surface thereof to establish within the separator conduit means a fluid column to a height responsive to the mean water level of the body of water;

supplying an oil-containing fluid mixture into the fluid column within the separator conduit means in a manner sufficient to permit oil to rise to the upper region of the fluid column so as to establish an upper oil layer of the fluid column;

establishing a head of total fluid in the settling tank means at a level independent of the mean water level of the body of water thereby to enable oil to rise to the upper region of the settling tank so as to establish an upper oil layer of the total fluid therein;

intermittently transporting fluid from said upper region of the fluid column to the established head of fluid in the settling tank means;

refluxing fluid from the lower end of the settling tank means to the separator conduit means; and recovering oil which rises to the upper oil layer in the settling tank means.

14. The method according to claim 13 wherein:

the upper portion of the head of fluid in the settling tank is confined to increase the depth of the upper oil layer.

15. The method according to claim 13 wherein the recovery step comprises:

spilling the confined upper oil layer over a barrier, isolating the spillover oil from the established head of total fluid, and withdrawing the isolated oil.

16. The method according to claim 15 wherein the recovery step further comprises:

adjusting the height at which oil spillover occurs.

17. The method according to claim 9 wherein:

the head of fluid in the settling tank means is established by a level control weir means through which fluid from the settling tank means is refluxed.

18. A settling tank for oil recovery, comprising:

a generally cylindrical vessel;

an open-ended generally conical barrier disposed internally of said vessel at its upper end;

said vessel and said barrier being operable to establish:

a head of an oil containing fluid mixture, whereby the depth of oil rising to the top layer of such head of fluid is increased near the upper end, and an isolated region for spillover oil;

level control weir means for maintaining the level of said head of fluid; and an-open-ended tube mounted in the upper end of said barrier and forming a continuation thereof; said tube being adjustable relative to said level control weir means.

* * * * *